US010522138B1

(12) United States Patent
Sambarino

(10) Patent No.: US 10,522,138 B1
(45) Date of Patent: Dec. 31, 2019

(54) REAL-TIME VOICE PROCESSING SYSTEMS AND METHODS

(71) Applicant: Groupe Allo Media SAS, Paris (FR)

(72) Inventor: Romain Sambarino, Paris (FR)

(73) Assignee: Groupe Allo Media SAS, Paris (FR)

( * ) Notice: Subject to any disclaimer, the term of this patent is extended or adjusted under 35 U.S.C. 154(b) by 0 days.

(21) Appl. No.: 16/272,495

(22) Filed: Feb. 11, 2019

(51) Int. Cl.
*G10L 15/183* (2013.01)
*H04M 3/51* (2006.01)
*G10L 15/32* (2013.01)
*G10L 15/26* (2006.01)

(52) U.S. Cl.
CPC .......... *G10L 15/183* (2013.01); *G10L 15/265* (2013.01); *G10L 15/32* (2013.01); *H04M 3/5175* (2013.01)

(58) Field of Classification Search
CPC ..... G10L 15/183; G10L 15/32; G10L 15/265; H04M 3/5175
USPC .......................................................... 704/257
See application file for complete search history.

(56) References Cited

U.S. PATENT DOCUMENTS

| 8,238,540 | B1* | 8/2012 | Duva | H04M 3/51 379/265.01 |
| 8,401,172 | B1 | 3/2013 | Duva et al. | |
| 8,577,016 | B1* | 11/2013 | Duva | G06Q 10/00 379/201.01 |
| 8,687,794 | B1* | 4/2014 | Spievak | G06Q 30/02 379/207.02 |
| 8,755,511 | B2 | 6/2014 | Duva et al. | |
| 8,767,946 | B1 | 7/2014 | Duva et al. | |
| 8,781,105 | B1* | 7/2014 | Duva | G06Q 30/0246 379/201.01 |
| 8,917,860 | B2 | 12/2014 | Duva et al. | |
| 9,036,808 | B2 | 5/2015 | Kelley et al. | |
| 9,167,078 | B2 | 10/2015 | Spievak et al. | |
| 9,171,322 | B2 | 10/2015 | Spievak et al. | |
| 9,292,861 | B2 | 3/2016 | Spievak et al. | |
| 9,438,733 | B2 | 9/2016 | Spievak et al. | |
| 9,621,729 | B2 | 4/2017 | Spievak et al. | |
| 9,699,309 | B2 | 7/2017 | Spievak et al. | |
| 9,786,281 | B1* | 10/2017 | Adams | G10L 15/265 |
| 10,152,968 | B1* | 12/2018 | Agrusa | G10L 15/22 |
| 2010/0268534 | A1* | 10/2010 | Kishan Thambiratnam | G10L 15/07 704/235 |
| 2010/0299135 | A1* | 11/2010 | Fritsch | G06F 17/2785 704/9 |
| 2012/0253817 | A1* | 10/2012 | Trinh | H04M 3/4935 704/270 |
| 2014/0058831 | A1* | 2/2014 | Duva | G06Q 30/0246 705/14.45 |
| 2014/0172504 | A1* | 6/2014 | Duva | H04M 3/51 705/7.31 |
| 2014/0214530 | A1 | 7/2014 | Duva et al. | |

(Continued)

*Primary Examiner* — Edwin S Leland, III
(74) *Attorney, Agent, or Firm* — Goodwin Procter LLP

(57) ABSTRACT

A computer-implemented method and supporting system transcribes spoken words being monitored from a telephonic interaction among two or more individuals. Telephonic interactions among the individuals are monitored, and at least two of the individuals are each assigned to a separate channel. While still being monitored, each of the channels is assigned a context-based speech recognition models, and in substantially real-time, the monitored telephonic interaction is transcribed from speech to text based on the different assigned models.

12 Claims, 7 Drawing Sheets

(56) References Cited

U.S. PATENT DOCUMENTS

| | | | | |
|---|---|---|---|---|
| 2014/0314215 A1* | 10/2014 | Duva | ................ | G06Q 30/0202 |
| | | | | 379/88.01 |
| 2015/0071427 A1* | 3/2015 | Kelley | ............... | G06Q 30/0202 |
| | | | | 379/265.09 |
| 2015/0131788 A1* | 5/2015 | Gainsboro | .......... | H04M 3/2281 |
| | | | | 379/88.01 |
| 2015/0213512 A1* | 7/2015 | Spievak | ............ | G06Q 30/0275 |
| | | | | 705/14.71 |
| 2015/0249737 A1* | 9/2015 | Spievak | ............... | H04M 3/436 |
| | | | | 379/189 |
| 2015/0358459 A1 | 12/2015 | Spievak et al. | | |
| 2015/0379562 A1* | 12/2015 | Spievak | ............ | H04M 3/5158 |
| | | | | 379/265.09 |
| 2016/0173693 A1* | 6/2016 | Spievak | ............ | G06Q 30/0202 |
| | | | | 379/265.09 |
| 2017/0034351 A1 | 2/2017 | Spievak et al. | | |
| 2017/0178182 A1* | 6/2017 | Kuskey | ............ | G06Q 30/0246 |
| 2017/0185375 A1* | 6/2017 | Martel | ................... | G06F 3/167 |
| 2017/0201613 A1* | 7/2017 | Engelke | ................. | G10L 15/06 |
| 2017/0206808 A1* | 7/2017 | Engelke | ................. | G09B 21/04 |
| 2017/0206888 A1* | 7/2017 | Engelke | .................. | H04W 4/16 |
| 2017/0230497 A1* | 8/2017 | Kim | ................ | H04M 1/72583 |
| 2017/0302794 A1 | 10/2017 | Spievak et al. | | |
| 2017/0352345 A1* | 12/2017 | Kurata | ................... | G10L 15/01 |
| 2018/0034961 A1* | 2/2018 | Engelke | ................ | G10L 15/265 |
| 2018/0270350 A1* | 9/2018 | Engelke | ............ | H04M 3/42391 |

\* cited by examiner

REAL-TIME VOICE PROCESSING SYSTEMS AND METHODS

TECHNICAL FIELD

The present disclosure relates generally to voice recognition and transcription and, more particularly, to a real-time data and processing systems for recognizing and responding to speech.

BACKGROUND

Over the past twenty years, companies have shifted significant marketing and customer support resources to web-based applications. As a result, it is not uncommon for a consumer's entire interaction with a company to occur via the web. This may include, for example, searching for a desired product or service, reading reviews, submitting questions via email or online chat, making the purchase, and receiving customer support. While the technologies and systems that facilitate these transactions have certainly been transformative, there still remains a need for human interaction.

In such cases, call centers provide the first "live" point of contact between a consumer and a company. Various systems and methods have been implemented to increase the efficiency with which incoming calls are processed. For example, number recognition systems may route a call to a particular call center based on its geographic association, and automated menu systems (e.g., "press or say 'one' for calls regarding new reservations") can direct incoming calls to particular agents or departments within a customer service organization.

Nonetheless, consumer interactions with automated and semi-automated customer service call centers remains difficult for many consumers, is expensive and inefficient for the companies, and the much of the contextual information that may be harvested from the interactions is lost.

BRIEF SUMMARY

A computer-implemented method for transcribing spoken words to text includes electronically monitoring a telephonic interaction having at least two different speakers (e.g., a service consumer and a service provider), and assigning each speaker to a different channel. While monitoring the telephonic interaction, different context-based speech recognition models are assigned to the different channels, and, in substantially real-time, the monitored telephonic interaction is transcribed from speech to text based on the different assigned models.

In some embodiments, certain context-based speech recognition models include one or more language-specific variants, geography-specific variants, and/or role-specific variants, and the assignment of the models to a channel may be based at least in part on a language and/or dialect being spoken within the one of the channels, or, in some cases, on a transaction role (e.g., consumer, service provider, etc.). The models may, in certain implementations, be organized according to a hierarchical structure, and in some specific versions, the structure may include a language level, a dialect level, a role level and a term level.

In some embodiments, the method may also include swapping the assigned context-based speech recognition models with an alternate context-based speech recognition model while still monitoring the telephonic interaction. More specifically, and in instances where the context-based speech recognition models are organized in a hierarchical structure, the alternate context-based speech recognition model may be a subspecies (e.g., a particular role, within a set of language-specific models) of the assigned context-based speech recognition model initially assigned to the channel. In some implementations, the selection of the alternate context-based speech recognition model is based at least in part on speech from one of the other of the two different channels, and in instances in which the speech from a channel is a question, the alternate context-based speech recognition model may include a fixed set of possible answers for the question.

In further embodiments, the method may also include presenting the transcribed text to a user operating as one of the channels via an electronic user interface and while monitoring the telephonic interaction.

In another aspect of the invention, a system for transcribing spoken words to text includes at least one memory for storing computer-executable instructions and at least one processor for executing the instructions stored on the memory. Execution of the instructions causes the processor to perform operations including electronically monitoring a telephonic interaction having at least two different participants, each participant being assigned to a distinct channel. While monitoring the telephonic interaction, different context-based speech recognition models are assigned to at least two different channels, and in substantially real-time, transcribing the monitored telephonic interaction from speech to text based on the different assigned models.

In some embodiments, the system may also include an electronic user interface on which the transcribed text is presented to a user operating as one of the channels via and while monitoring the telephonic interaction. The system may also include one or more data storage modules for storing the transcribed text, the recorded telephonic interactions and/or the context-based speech recognition models.

In some embodiments, certain context-based speech recognition models include one or more language-specific variants, geography-specific variants, and/or role-specific variants, and the assignment of the models to a channel may be based at least in part on a language and/or dialect being spoken within the one of the channels, or, in some cases, on a transaction role (e.g., consumer, service provider, etc.). The models may, in certain implementations, be organized according to a hierarchical structure, and in some specific versions, the structure may include a language level, a dialect level, a role level and a term level.

In some embodiments, execution of the instructions programs swaps the assigned context-based speech recognition models with an alternate context-based speech recognition model while still monitoring the telephonic interaction. More specifically, and in instances where the context-based speech recognition models are organized in a hierarchical structure, the alternate context-based speech recognition model may be a subspecies (e.g., a particular role, within a set of language-specific models) of the assigned context-based speech recognition model initially assigned to the channel. In some implementations, the selection of the alternate context-based speech recognition model is based at least in part on speech from one of the other of the two different channels, and in instances in which the speech from a channel is a question, the alternate context-based speech recognition model may include a fixed set of possible answers for the question.

The details of one or more implementations of the subject matter described in the present specification are set forth in the accompanying drawings and the description below.

Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

Figure 1:
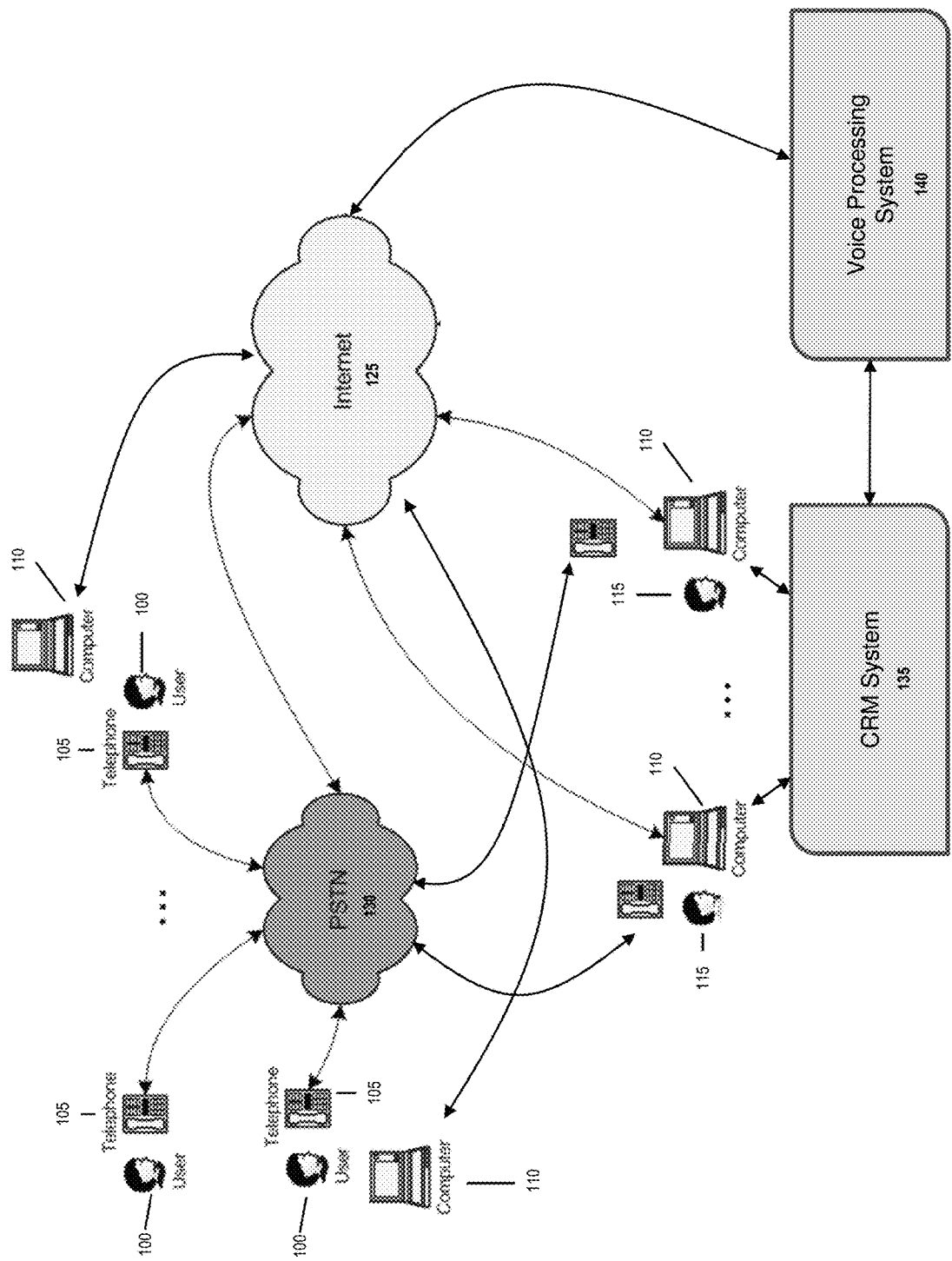
FIG. 1 depicts an environment in which various embodiments of the invention may be implemented to capture and process telephonic interactions.

Referring now to the drawings, wherein like reference numerals and characters represent like or corresponding parts and steps throughout each of the many views, FIG. 1 illustrates an exemplary environment in which various embodiments of the invention may be implemented to facilitate improved telephone-based customer service.

Users 100 wishing to inquire about and/or purchase various goods and services may do so using telephones 105 (e.g., land-based telephones or mobile devices) as well as computers 110 (which may be traditional desktop terminals, laptop computers, pad computers, web and application-enabled mobile devices). The users 100 may use the telephones 105 and/or computers 110 to speak with or otherwise communicate with customer service representatives 115 via telephones 105 and/or computers 110.

The telephones 105 and computers 110 may use one or more networks to communicate with each other and other participants using the system. The network may simply comprise the Internet (also known as the "Web" or "World Wide Web") 125, but it may similarly comprise intranets, extranets, virtual private networks (VPNs), and the like. Because the system is also adapted to be coupled to one or more phones 105, the network may also comprise a PSTN 130 (i.e., the public circuit-switched telephone networks).

The PTSN 130 include both fixed-line analog telephone systems, as well as cellular networks supporting mobile devices.

In call center applications, an entity (e.g., a company, utility, government office, etc.) may use a customer relationship management ("CRM") application 135 to assist the customer service representatives 115 in answering questions from and providing information to the consumers 100. Exemplary CRM applications include Salesforce CRM, Oracle CRM, NetSuite CRM, and others, and their primary purposes are to assist customer service representatives in tracking and managing customer interactions, identify cross-selling opportunities, and facilitate the resolution of customer issues. In conjunction with a CRM application 135, a voice processing system 140, as described herein, provides significantly enhanced functionality, which, when used in conjunction with various CRM applications 135, facilitates the rapid and accurate speech to text and voice recognition in near real time.

Figure 2:
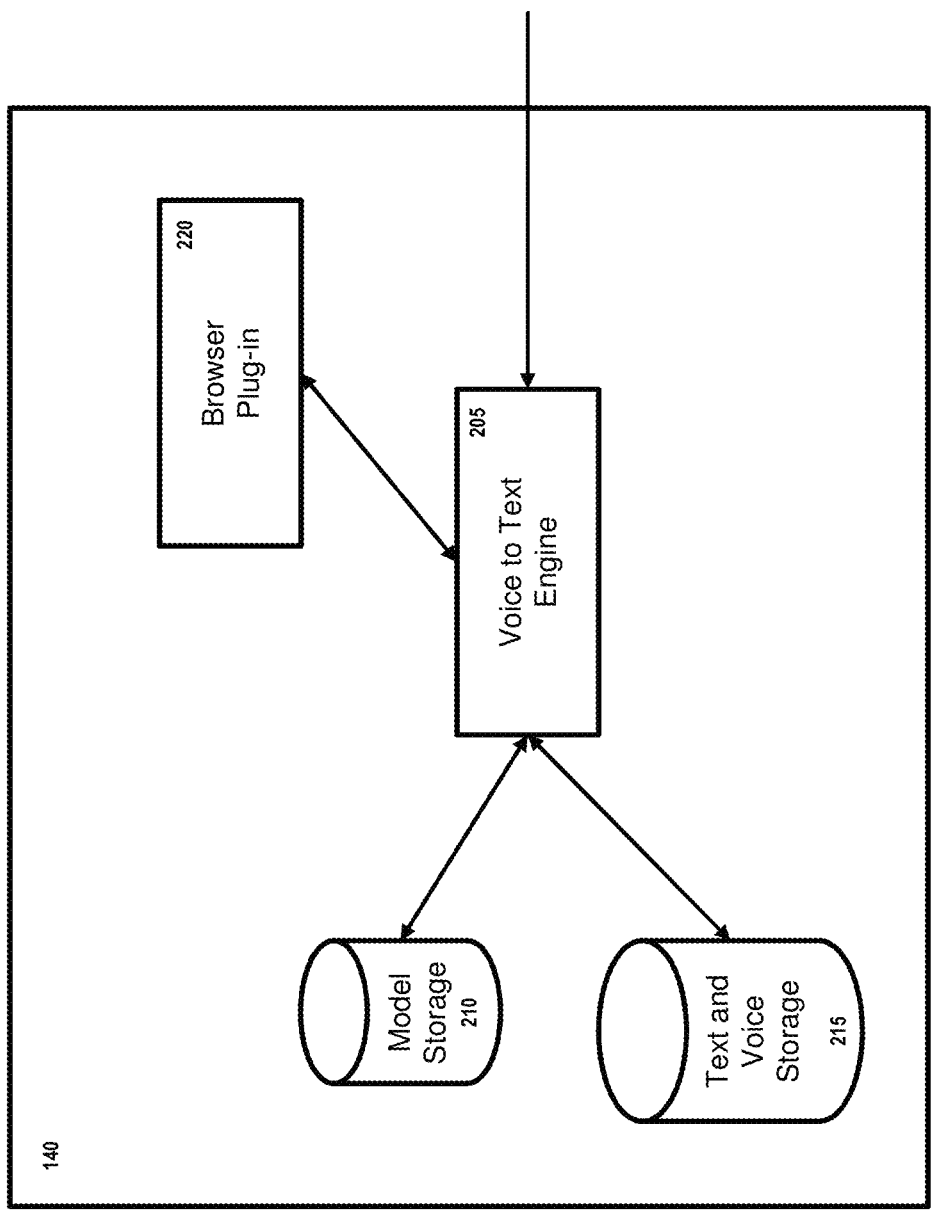
FIG. 2 depicts a schematic of a system for transcribing and presenting real time telephonic interactions in accordance with various embodiments of the invention.

Referring now to FIG. 2, the voice processing system 140 includes a voice to text engine 205, one or more storage modules (210 and 215) for storing speech to text models (described in greater detail below), recorded voice conversations, and the resulting transcribed text. In certain embodiments, a browser plug-in 220 may be provided to the client devices 110 used by the customer service representatives 115 to enhance the functionality of a CRM application 135. The plug-in 220 may, for example, be a javaScript file that provides a communication link (via API or iFrame) to the CRM application.

Figure 3:
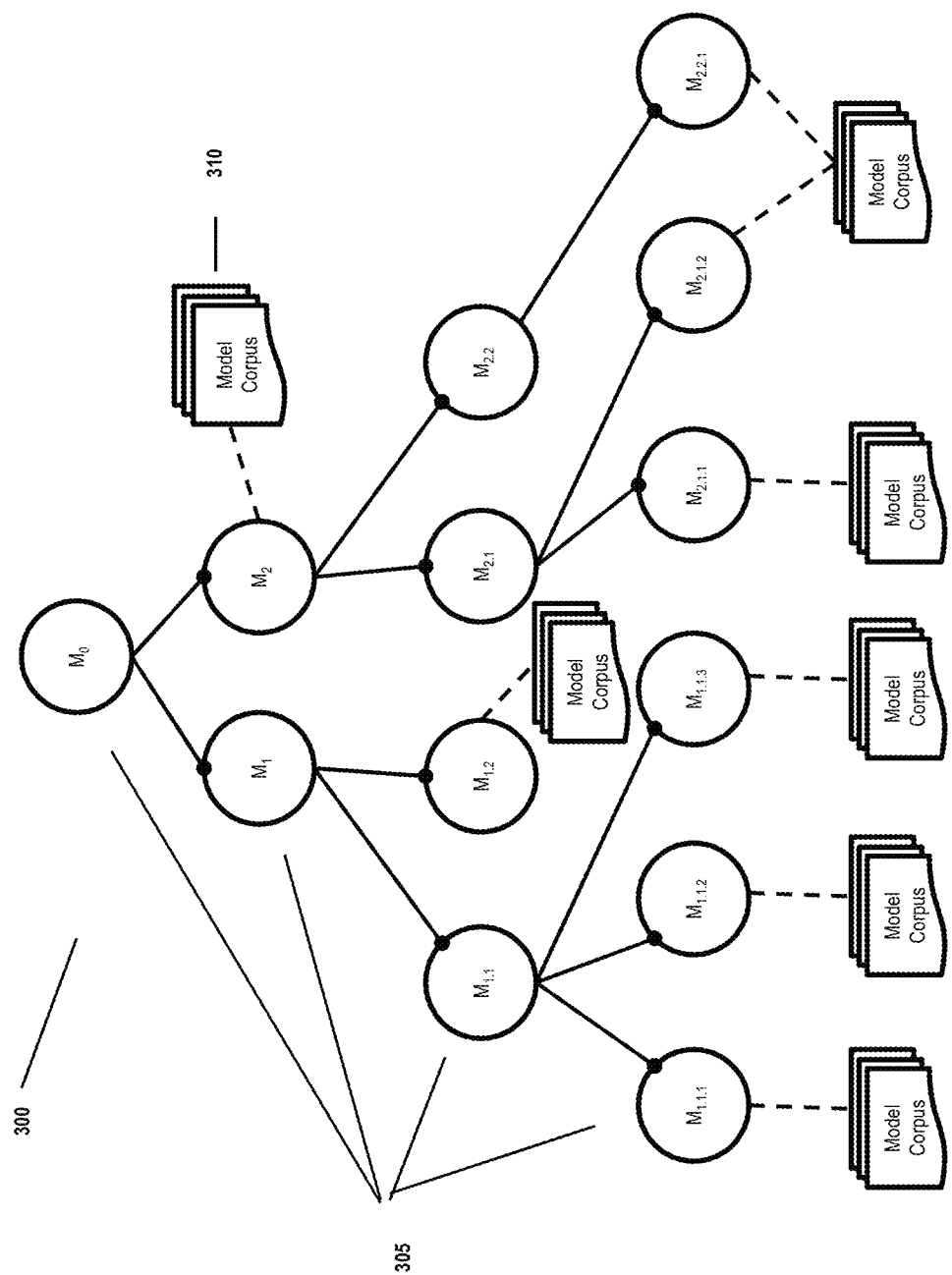
FIG. 3 is an illustration of a collection of hierarchically-organized models that may be used to transcribe speech to text while monitoring telephonic interactions in accordance with various embodiments of the invention.

Referring now to FIG. 3, embodiments of the invention provide techniques and supporting systems for organizing speech to text models according to various characteristics. Furthermore, and as detailed below, individual conversations can also be characterized and classified such that they can be "assigned" to an appropriate model.

More specifically, FIG. 3 illustrates one exemplary collection of models 300 that is organized according to a hierarchical structure 305. In this case, the top-most model ($M_0$) is the most general—for example a model built and trained using an entire corpus of speech accessible to the system. However, dependent models $M_1$ and $M_2$ may be based on one or more model corpus 310 comprising only a subset of the corpus used to build model $M_0$. The selection of speech used may be based on selecting only those conversations that are in a particular language, or in some cases that use a particular dialect. In some embodiments, selected conversations are identified as being "non-native"—and thus removed from a corpus. For example, an Englishman moving to Paris and calling to initiate utility service at a newly rented flat may speak French during the conversation, but with a heavy accent or using imperfect grammar or vocabulary. These conversations can be flagged and removed from any model training.

Continuing with the illustration of FIG. 3, models $M_1$ and $M_2$ may be language-specific—e.g., $M_1$ being trained on only English speech and $M_2$ being trained on only French speech. Moving down the hierarchy, models $M_{1.1}$ and $M_{1.2}$ may be used to distinguish different dialects of English, such as British versus American. Likewise, models $M_{2.1}$ and $M_{2.2}$ may be used to distinguish different dialects of French, such as Parisian and Alsatian. The selection of a "child" model (e.g., selecting $M_{1.1}$ once model $M_1$ is in use may be based on a number of factors, such as a recognized dialect or use of certain terms (e.g., the use of "fridge", "refrigerator" or "icebox" may indicate the caller is from the United States or the U.K.), a call center representative recognizing a dialect, or, in some cases, recognizing the geographic region based on the telephone number (e.g., a country code or area code).

In some instances, certain models may be even more specific—for example, the British English model $M_{1.1}$ may have more specific, dependent models that are contextual in nature—that is the corpus of speech used to train the models and the set of terms within the model is limited to words or phrases that are specific to a particular topic or represent a closed set of possible answers to a question. That is, the different models $M_{1.1.1}$, $M_{1.1.2}$ and $M_{1.1.3}$ may be used at different points of a conversation or in response to previously identified text. The models may be stored along with certain meta data that identifies the context in which the model is to be selected for use. Such meta data may include a language, dialect, geographic region, general subject (e.g., travel), service provider function or name (e.g., wireless, Rogers Telecom, etc.) or descriptive set (numbers, dates, cities) or other context-specific tags (e.g., Y/N).

Figure 4:
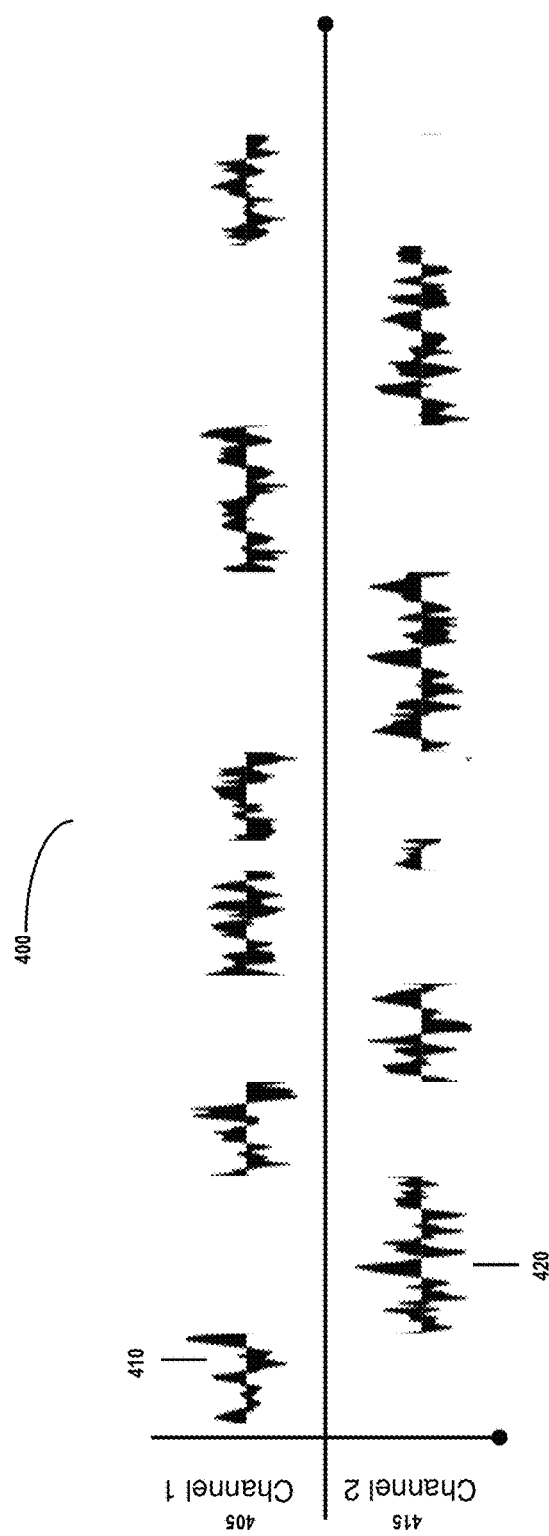
FIG. 4 illustrates two separate channels of speech identified within a single telephonic interaction in accordance with various embodiments of the invention.

Referring now to FIG. 4, call center operations generally consist of a conversation between two individuals—a consumer requesting a product, information, or service, and a call center representative who is charged with assisting the consumer. Unlike conventional call center applications and CRM systems that record, process and store the speech as a single file, various embodiments of the system 200 identify and create separate channels based on the speaker. That is a conversation 400 between two individuals may be recorded on two channels—channel 1 (405) being the customer service representative, and channel 2 (410) being the consumer. The separation may be done based on the source of the speech (channel 1 from a remote device, and channel 2 from an internal device), the individual's speech patterns, or, in some cases, the order of the speech. For example, if the representatives are trained to answer each call with a certain greeting, all subsequent speech from that individual is identified as channel 1 and all other speech as channel 2. The recorded speech may be stored as a single file with the two channels identified using metadata associated with the file, or stored as two files tagged as being related to a single conversation. As a result, speech from one individual (410) is identified as separate from speech from another individual (420), thus allowing different models to be applied when converting the speech to text.

For example, when a consumer calls into the system and their speech is recognized as English (or, in some cases the service representative identifies the language), the voice to text engine 205 identifies the language and retrieves an English speech to text model from the model storage device 210, and the speech is processed using the new model going forward. Furthermore, when the voice to text engine 205 (or, in some cases the customer service representative) identifies the conversation as being related to a request to schedule an appointment for a service call, a more specific model that has been trained on speech solely relate to scheduling, location identification and the requested services may be selected. In some instances, even more specific models that are limited to a relatively small set of possible responses (e.g., yes/no, numbers, dates, cities, etc.) may be used to increase the efficiency and accuracy of the speech to text engine 205.

Figure 5:
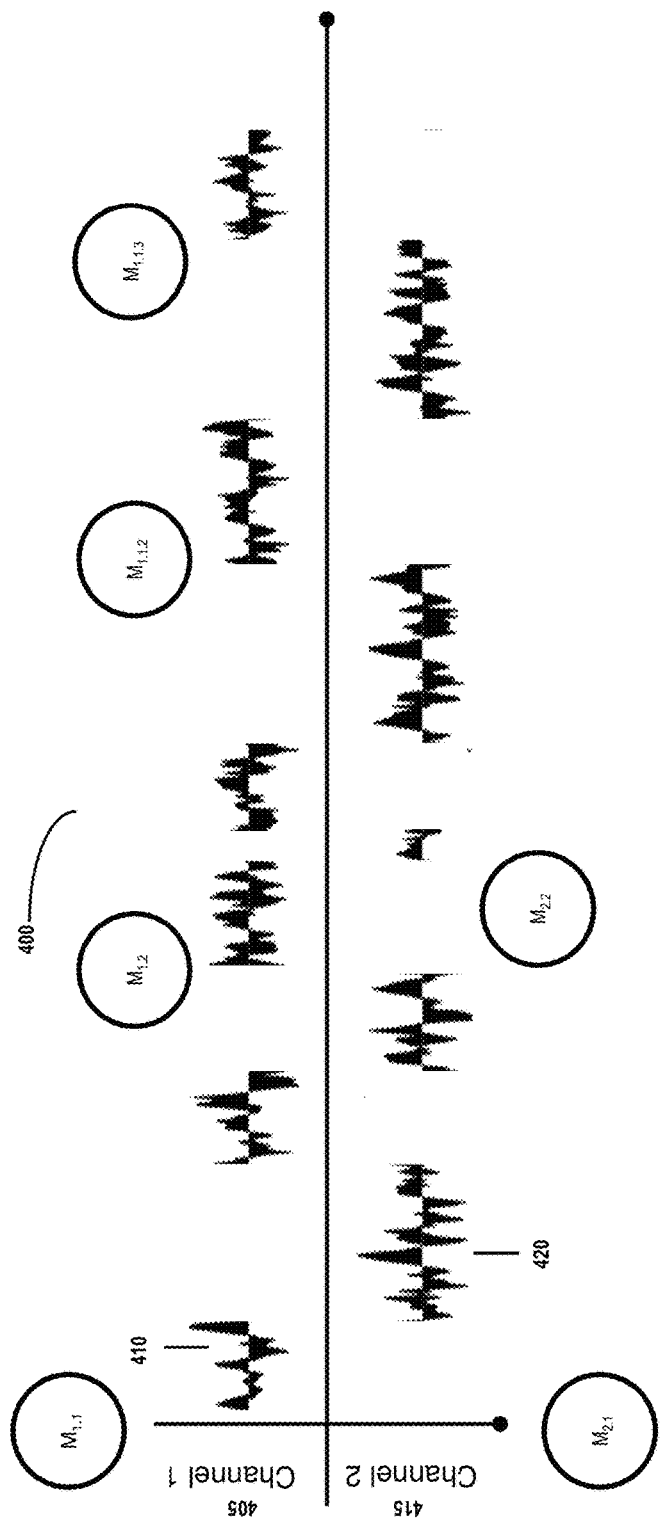
FIG. 5 illustrates the assignment of various speech-to-text models to two separate channels of speech and separate sections of each channel identified within a single telephonic interaction in accordance with various embodiments of the invention.

FIG. 5 illustrates one embodiment wherein different models are used to convert speech to text for a single conversation 400. For example, in an implementation where consumers are calling into a call center for a utility to initiate electrical service at their home, the voice to text engine 205 may initially identify the two channels, 405 and 410, as described above. The voice to text engine 205 then selects two models—model $M_{1.1}$ and model $M_{2.1}$ which in this example may be limited to speech and text routinely used by customer service representatives (for channel 1) and likely responses and questions from consumers related to the appliances, costs, and service visit scheduling (for channel 2). As the conversation progresses, the customer service representative may ask a particular question (e.g., "please list out the appliances that you will be using at your new residence"), which may be part of scripted set of questions stored in a more specific model (e.g., model $M_{1.2}$) limited to the possible words and phrases to those questions. In such a case, the system may swap model $M_{1.1}$ with model $M_{1.2}$ which, because of the significantly smaller set of possible words to convert from speech to text, can complete the task much faster and more accurately.

Likewise, the use of a particular model used for one channel as described above may trigger the use of a different model on the other channel. More specifically, when a customer service representative asks the question noted above regarding appliances, model $M_{1.2}$ (used to transcribe general consumer questions) may be swapped with model $M_{2.2}$ which is trained to identify different types of appliances (e.g., oven, microwave, dryer, etc.). Because the set of possible responses from the consumer is so limited, the speed and accuracy with which the system can translate the speech into text is significantly increased as compared to the use of a general model, or even a language-specific model. As the conversation progresses, models may then be swapped in and out depending on the context of the conversation and/or text recognized during the conversation.

In one particular example, a representative may ask the caller a question such as "what day is best for a service visit"—where the possible answers are limited to the days of the week, and relative dates such as "today", "tomorrow", "weekend" etc. In one extreme example, a model is used solely to distinguish between binary answers such as "yes" and "no." In some cases where a context-specific model cannot ascertain the content of the conversation (perhaps the speaking is not answering the question asked or starts a new topic), the model currently in use may prove to be inefficient, and in such cases a more general model may replace the more specific model.

In some embodiments, the conversations and portions of conversations may also be "tagged" or classified based on a set of characteristics based on a structured graph (e.g., node/edge graph, hierarchical decision tree, etc.) For example, if a conversation regarding the purchase of a mobile services subscription is captured and stored, that conversation can be "tagged" based on the language and dialect spoken, the type of call (sale, customer service, successful sale, warm lead, etc.) and/or the overall subject matter of the conversation. In some instances, different classification processes may be chained together such, resulting in a more specific classification of the conversation. In one exemplary embodiment, a conversation may be classified as a "service call" based, for example, on a classification process that reviews and recognizes the speech of the caller and assigned to a particular graph node for "service calls." That same call may then be further classified as a "lead" as the representative identifies that the caller is interested in purchasing additional services (e.g., a more lucrative data plan, international service, an additional device, etc.). The process can continue until the conversation is classified to a "final" leaf on the graph—meaning there is no additional value in further distinguishing the call.

The process of classifying the calls may also be done manually for a certain number of calls to guarantee absolute accuracy. The set of manually classified calls may then serve as a corpus for the automated voice to text processing models used to transcribe subsequent calls.

Moreover, conversation may be segmented such that certain portions are tagged with context-specific metadata. As a result, the segments of conversations (e.g., answers to specific questions, closed data sets) can be used as corpuses for building and training models for subsequent use. In some instances, the conversations may be tagged in real time as the system (or an operator) recognizes that the conversation is about a particular subject or related to a particular product or service, and in doing so instructs the system to apply a corresponding voice to text model for use in transcribing the conversation.

In some embodiments, and particularly those in which the conversations may include sensitive, personal or statutorily protected information (generally referred to herein as "protected information), the voice to text engine may recognize certain speech as either eliciting and/or containing protected information. In some cases, the corpus of information deemed to be "protected" may be defined generally by statute—e.g., the General Data Protection Regulation ("GDPR"), the Health Insurance Portability and Accountability Act ("HIPPA"), and/or the Family Educational Rights and Privacy Act ("FERPA"). For example, the protected information may include financial information such as account numbers, personal information such as government ID numbers, health information, and others. In the example described above, a conversation between the consumer and service representative may include a discussion regarding payment, in which case the service representative may ask "please provide your credit card number for payment please." Recognizing this question as both (a) having a limited response set, generally numbers, and (b) being considered protected information, the system may not only utilize a particular context-specific model, but as the text is transcribed, certain elements of the text deemed to be protected information may be remove, skipped or obfuscated. By doing so, the resulting screen images presented to the representatives and, perhaps the stored recorded voice and text files may be devoid of protected information, therefore eliminating the need to comply with statutory requirements regarding encryption, storage, and distribution.

Figure 6:
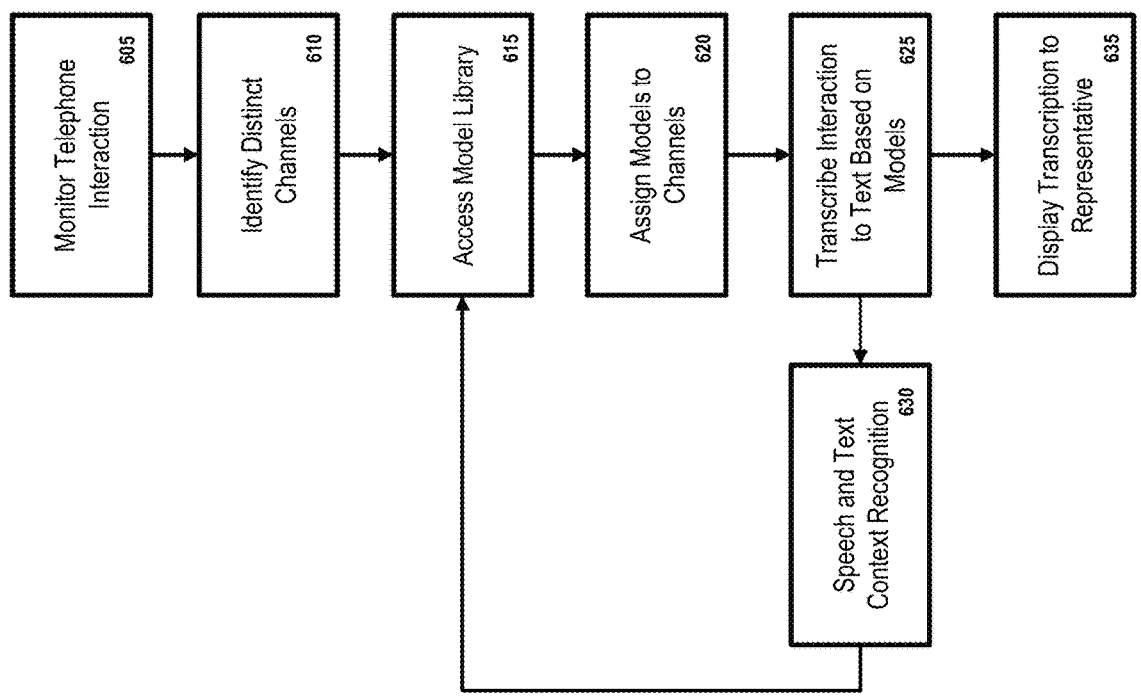
FIG. 6 is a flowchart illustrating one exemplary method for transcribing speech to text using various models in accordance with various embodiments of the invention.

FIG. 6 illustrates one embodiment of the process for using context-specific models to accelerate the transcription of speech to text. Initially, calls are monitored as they are received at a call center (Step 605). Two or more distinct voice channels are then identified (Step 610), which may be used to segment the conversation into different voice streams, typically one for each individual participating in the conversation. In most instances, the number of channels is two—being one for the caller and one for the call recipient. However, there may be instances in which more than two people are participating in the call (e.g., a conference call among a number of individuals) and a separate channel may be assigned to each participant. In some cases, the number of channels is the same as the number of participants, whereas in other implementations more than one individual may be assigned to a single channel. Based on the conversation, one or more voice to text models are retrieved from a model storage device (Step 615) and assigned to the appropriate channel (Step 620). The model(s) are then used by the voice to text engine to transcribe the incoming conversation in real time (Step 625). Based on the transcribed speech, certain language and/or contextual elements of the conversation may be recognized (Step 630), resulting in the selection of a new model (returning to Step 615) and subsequent transcription using the newly selected model. As the speech is transcribed, it is then displayed to the representative (Step 635) within or in conjunction with a CRM system while the conversation remains active.

Figure 7:
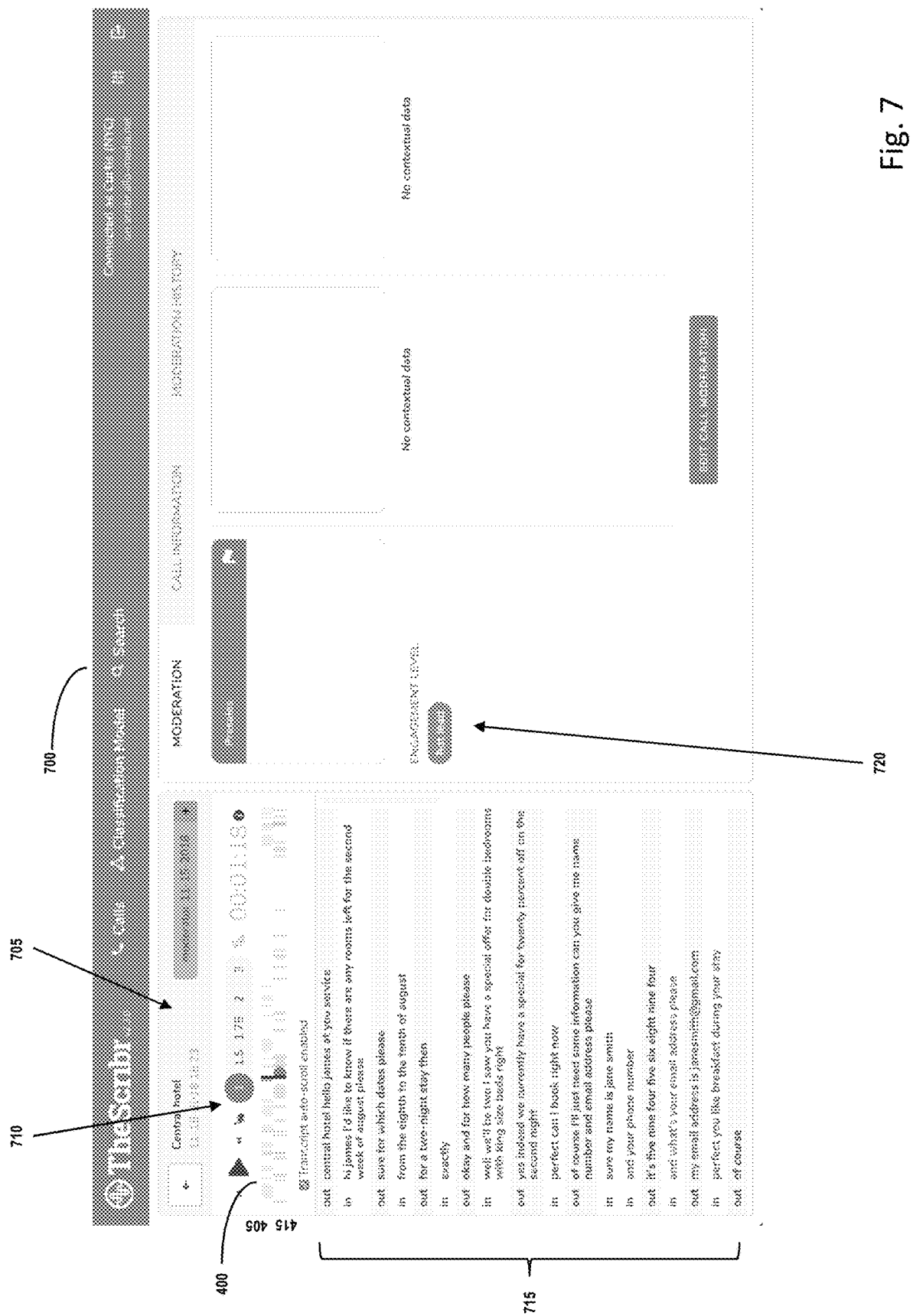
FIG. 7 is an illustrative user interface screen from an application for facilitating customer service interactions that includes transcribing speech to text using various models in accordance with various embodiments of the invention.

FIG. 7 illustrates one example of an application screen 700 that may be used by a customer representative as they field calls using the described system and methods. The screen 700 includes an indication field 705 showing the product or service provider (in this case a hotel), the date and time of the call, and participant information. Also included on the screen is a set of controls 710 that may be used to speed up, slow down, pause or replay the conversation and a graphical representation of the different channels (405 and 415) into which the conversation has been segmented. An ongoing transcription of the conversation 715 is shown (in this case as a scrolling list with each channel indicated using a different shading. Other sections of the screen 700 provide additional fields 720 for capturing information from the representative, or for tagging the conversation for subsequent use or analysis.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for transcribing spoken words to text, the method comprising:
    electronically monitoring a telephonic interaction, the interaction comprising at least two different channels;
    while monitoring the telephonic interaction, assigning a different one of a plurality of context-based speech recognition models to each of the at least two different channels;
    for at least one of the two different channels, swapping the assigned context-based speech recognition models with an alternate context-based speech recognition model while still monitoring the telephonic interaction; and
    while monitoring the telephonic interaction, transcribing the monitored telephonic interaction from speech to text based on the different assigned models,
wherein the alternate context-based speech recognition model selected for at least one of the two different channels is based at least in part on speech from one of the other of the two different channels and wherein the speech from one of the other of the two different channels comprises a question, and the alternate context-based speech recognition model comprises a fixed set of possible answers for the question.

2. The method of claim 1, wherein one of the two different channels represents a service consumer and the other one of the two different channels represents a service provider.

3. The method of claim 1, wherein a subset of the plurality of context-based speech recognition models include language-specific variants such that the assignment of one of the plurality of context-based speech recognition models to one of the channels is based in part on a language being spoken within the one of the channels.

4. The method of claim 1, wherein a subset of the plurality of context-based speech recognition models include geography-specific variants such that the assignment of one of the plurality of context-based speech recognition models to one of the channels is based in part on a dialect being spoken within the one of the channels.

5. The method of claim 1, wherein a subset of the plurality of context-based speech recognition models include role-specific variants such that the assignment of one of the plurality of context-based speech recognition models to one of the channels is based in part on a transaction role of one of the channels.

6. The method of claim 1, further comprising presenting, via an electronic user interface and while monitoring the telephonic interaction, the transcribed text to a user operating as one of the channels.

7. A system for transcribing spoken words to text, the system comprising:
    at least one memory for storing computer-executable instructions; and
    at least one processor for executing the instructions stored on the memory, wherein execution of the instructions programs the at least one processor to perform operations comprising:
    electronically monitoring a telephonic interaction, the interaction comprising at least two different channels;
    while monitoring the telephonic interaction, assigning a different one of a plurality of context-based speech recognition models to each of the at least two different channels; and
    while monitoring the telephonic interaction, transcribing the monitored telephonic interaction from speech to text based on the different assigned models,
wherein execution of the instructions programs the at least one processor to perform operations further comprises selecting the alternate context-based speech recognition model for at least one of the two different channels based at least in part on speech from one of the other of the two different channels and wherein the speech from one of the other of the two different channels comprises a question, and the alternate context-based speech recognition model comprises a fixed set of possible answers for the question.

8. The system of claim 7, further comprising a data storage module for storing the transcribed text.

9. The system of claim 7, further comprising a user interface for presenting the transcribed text to a user while the user participates in the telephonic interaction.

10. The system of claim 7, further comprising a model storage module for storing the plurality of context-based speech recognition models.

11. The system of claim 7, wherein execution of the instructions programs the at least one processor to perform operations further comprises, for at least one of the two different channels, swapping the assigned context-based speech recognition models with an alternate context-based speech recognition model while still monitoring the telephonic interaction.

12. The system of claim 11, the plurality of context-based speech recognition models are organized in a hierarchical structure and the alternate context-based speech recognition model is a subspecies of the assigned context-based speech recognition model initially assigned to the channel.

* * * * *